Oct. 7, 1969  E. C. SUMNER  3,471,395
ANODE FOR CATHODIC PROTECTION
Filed Dec. 12, 1966
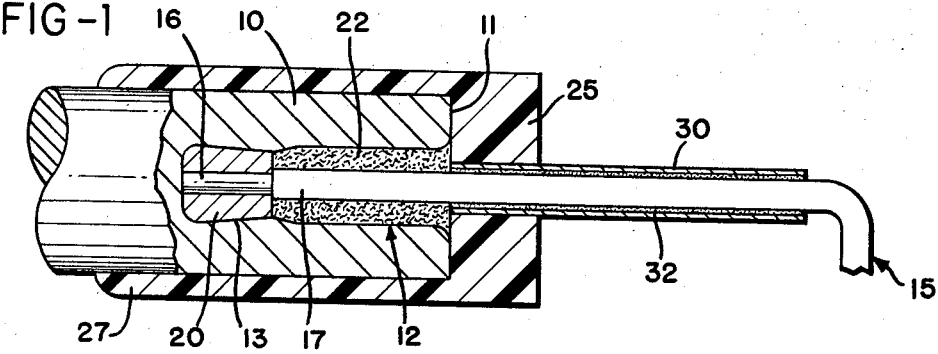
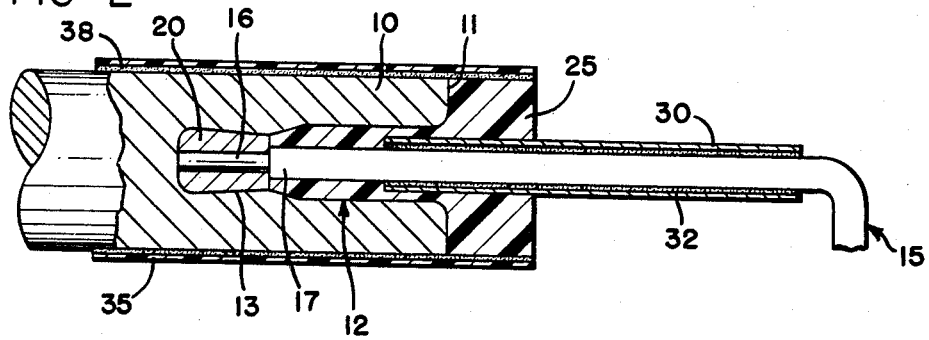
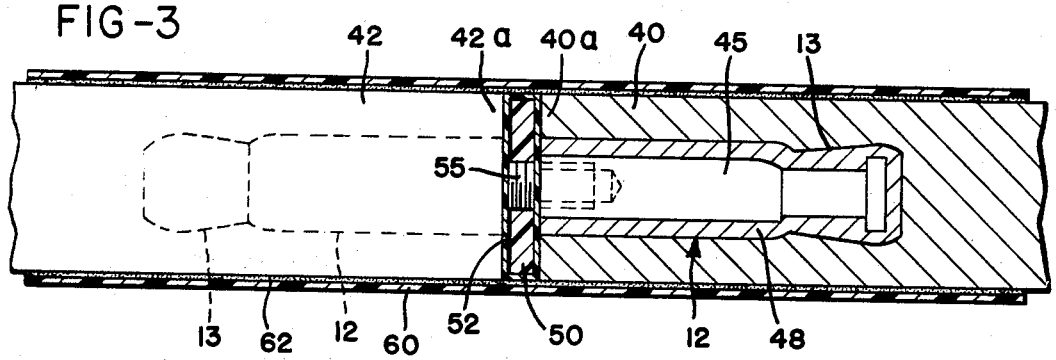
INVENTOR.
EARL C. SUMNER
BY
*Marechal, Biebel, French & Bugg*
ATTORNEYS

United States Patent Office 3,471,395
Patented Oct. 7, 1969

3,471,395
ANODE FOR CATHODIC PROTECTION
Earl C. Sumner, Dayton, Ohio, assignor to The Duriron Company, Inc., Dayton, Ohio, a corporation of New York
Filed Dec. 12, 1966, Ser. No. 600,961
Int. Cl. C23f *13/00*
U.S. Cl. 204—196                                10 Claims

ABSTRACT OF THE DISCLOSURE

A high silicon iron anode for corrosion protection at high temperatures having a heat shrinkable fluorocarbon sheath seal around the insulated conductor connection with a hydrophobic mastic between the sheath and the conductor. A plastic end cap surrounds the sheath, and in one form a second heat shrinkable fluorocarbon sheath surrounds the anode body and end cap to prevent entry of moisture into the anode-conductor connection. Anodes joined end-to-end include a washer therebetween and a heat shrinkable fluorocarbon to protect the joint.

---

This invention relates to anodes for cathodic protection, and more particularly to (1) a novel moisture seal system for use at the critical joint between the impressed current metal anode and insulated conductor and (2) between mechanically joined anodes.

Metallic structures such as metal pipelines, underground utility cables, elevated water tanks, buried tanks, and piers may be subjected to substantial corrosion located below ground, in brackish or sea water and in contact with other electrolytic medium or environment. One method of combating such corrosion is to protect the structure with a so-called cathodic protection system in which a sacrificial anode is the positive (+) electrode of an electrolytic cell with the structure to be protected being made the negative (−) electrode. A suitable electrical current is impressed to maintain the anode of the proper polarity with respect to the structure to be protected thereby avoiding electrochemical or corrosive removal of metal from the structure.

It is known to utilize anodes of a high silicon cast iron which provide the desired corrosion resistant characteristics for an anode. Due to the relatively long life of anodes of high silicon iron; for example, materials available commercially under the trademarks Durichlor and Duriron, it is necessary to provide mechanically strong and moisture-free connections between the metallic anode and the insulated conductor utilized to apply the impressed current. When anodes are used in salt water and brackish water, a by-product of the electrochemical action is chlorine gas which is highly corrosive. This is readily absorbed in water to form a highly corrosive solution with respect to materials such as copper and aluminum and steel and iron of conventional composition. In certain installations, particularly those involving a relatively high temperature and brackish water, such as open water box coolers used in refineries near coastal areas, industrial hot water heaters, pasteurizing units, the corrosive conditions under which the anode must perform are very severe.

Accordingly, it is primarily an object of the present invention to provide an anode structure utilizing an improved moisture seal arrangement between the insulated conductor and the metallic anode which is capable of withstanding the relatively aggressive conditions of comparatively high temperature and corrosive electrolyte.

Another object of the present invention is the provision of a chemically resistant moisture barrier for the mechanical connection by a suitable stud between two anodes of high silicon iron to attain lengths otherwise impractical to cast.

Another object of the present invention is the provision of a heat shrinkable chemically resistant moisture barrier of a fluorocarbon resin for sealing the connection between a metallic anode and the insulated conductor and for sealing the connection between two mechanically joined anode sections.

Other objects and advantages of the present invention will be apparent from the following description, the accompanying drawing and the appended claims.

In the drawing:

FIG. 1 is a view partly in section and partly in elevation of an anode connection in accordance with the present invention;

FIG. 2 is a view of a modified form of anode connection in accordance with the present invention; and FIG. 3 is a view of a mechanical connection between two anode sections which serve to provide a chemically resistant moisture barrier for the anode joint in accordance with the present invention.

Referring to the drawing, FIG. 1 shows an anode body 10 of high silicon cast iron having in excess of about 10% silicon content, and preferably, a high silicon cast iron having approximately 12% to 15% silicon. Representative commercially available materials are those available under the trademarks Duriron and Durichlor. The anode body is preferably cylindrical, and at least one end 11 thereof includes a cast recess 12 which includes an interlocking undercut portion 13. An insulated conductor cable 15 is connected to the anode 10 by baring the end 16 of the cable 15 from the electrically insulating layer 17 therearound, as indicated, and inserting the bared end 16 of the cable 15 into the undercut portion 13 of recess 12. With the cable 15 so positioned, lead or other electrically conductive fusible material is melted and poured into the undercut portion 13 of recess 12 so that when the lead solidifies upon cooling, a lead plug 20 is formed in the undercut portion 13 of the recess solidly fixing the cable 15 within the anode for electrical contact of the two elements. Due to the undercut or dove-tail configuration of portion 13 of recess 12, the solidified plug will also mechanically anchor the cable 15 solidly within the recess. It is preferred that the bared end 16 of the lead wire be tinned prior to introduction of the lead into the recess, and other materials such as babbit, solder or other low melting alloys may be utilized satisfactorily to form a firm, strong, mechanical and electrical connection between the cable 15 and anode 10 entirely within the anode in the undercut portion 13 of recess 12 and removed from the outer or exposed end of the anode.

The electrical cable may be a No. 8/7 or No. 6/7 strand insulated cable having a high molecular weight polyethylene plastic sheath around the conductor. As shown in FIG. 1, the remaining portion of the recess 12 is preferably filled with a mastic 22 to protect the above joint and to insulate the exposed wire while chemically protecting it. A satisfactory material for the insulating mass 22 is "Ozite B" a coal tar base potting compound.

Received over the end 11 of the anode is an anode cap 25, which in the embodiment shown in FIG. 1, is slightly larger in diameter than the anode and which extends along the outer surface thereof beyond the undercut portion 13 of the recess 12 as shown at 27. By extending the end cap beyond the recess, corrosion of the anode in this area is prevented thereby increasing the life of the anode-cable connection and thereby increasing the life of the anode. Also, this end cap extension increases the bonded area and entry of moisture and corrosive materials between the end cap and anode, and ultimately into the electrical connection in recess 12 is substantially eliminated.

The anode cap 25 is preferably made of an electrically nonconductive, chemically resistant material such as an epoxy resin, that is, the reaction product of epichlorohydrin and Bisphenol A suitably cured with an amine curing agent to provide a cap structure which is relatively hard (a durometer reading of 60 on the Shore D scale), and having a shear strength of about 2000 pounds per square inch or more. Also usable is a modified epoxy resin cured through a combination of heat and chemical curing agents to provide a cap having a Rockwell M hardness of about 104 and a tensile strength of about 12,500 pounds per square inch. Representative materials are those available under the trademarks Durcon 164 and Durcon 2A, respectively. Other materials which may be used are chemically resistant polyesters and phenolics or modified phenolics.

The anode cap is adhered to the anode body either because the cap is formed in place, as is the case with the Durcon 164 brand epoxy resin, or the cap may be cast separately of any of the materials previously described and adhered to the anode by use of an epoxy resin adhesive. Although the anode cap adheres to the anode body to prevent passage of water therebetween, it has been observed that the cap is only mechanically bonded to the lead-in wire as a result of shrinking of the anode cap during curing of the resin. While a "shrink fit" bond is acceptable in many applications, substantial mechanical movement of the lead-in wire sometimes forms an annular space where the lead-in wire passes through the cap thereby reducing the seal area and allowing moisture to penetrate into the connection. Thus, mechanical movement, plus the presence of relatively high ambient temperatures, for example, 150° F. to 200° F. present a working environment which adversely affects the performance of the seal.

In accordance with the present invention, a chemically resistant sheath 30 is so positioned as to eliminate substantial penetration of moisture into the recess through the joint between the insulated conductor and the anode cap. The sheath is substantially unaffected by corrosive materials which may be generated in the vicinity of the anode, for example, chlorine gas. As shown in FIG. 1, the corrosion resistant sheath 30 is positioned over the lead-in wire and extends through the anode cap 25 terminating part way into recess 12. The sheath 30 is a heat shrinkable tube of fluorocarbon resin, such as the copolymer of fluorinated ethylene propylene available under the trademark designation Teflon FEP. Between the sheath 30 and the polyethylene insulation of cable 15 is a water resistant mastic sealant 32 which has a high melting point and which is chemically resistant. The mastic sealant fills any voids or irregularities between the sheath 30 and the insulating plastic sheath around the cable 15. A usable mastic is one composed of finely divided fluorocarbon polymer particles mixed with a chlorinated paraffin wax or a chlorinated diphenyl resin. The mastic remains tacky, and because of the hydrophobic nature of the carrier tends to resist penetration by water or moisture, and the fluorocarbon polymer dispersed therein provides chemical resistance, particularly to the anode reaction products such as chlorine gas.

The inside and outside surface of the sheath 30 and the portion thereof surrounded by the anode cap is chemically bonded to anode cap 25 so as to provide a substantially completely sealed moisture barrier. This may be done by etching the sheath 30 with an anhydrous ammonia and sodium mixture and adhering the sheath to the cap either by casting the epoxy resin onto the sheath, or by adhering a pre-cast cap to the sheath with an epoxy resin.

It is preferred in accordance with the present invention that the sheath extend substantially beyond the end of the anode cap. For example, with an anode body of 1½ inch to 2 inches in diameter, the cap is approximately 4 inches by ¼ inch thickness and extends beyond the end 11 of the anode approximately one inch. The heat shrinkable sheath 30 extends at least 2 inches beyond the cap. The measurement of the sheath varies depending upon the size of the cable 15. For example, for a ⅜ inch diameter cable, a tube is used which in the expanded condition has an inner diameter of 0.440 inch and a recovered or final inside diameter of 0.349 inch to provide a recovered wall thickness of about 0.020 inch. In the case of a No. 4 cable, the expanded inner diameter is approximately 0.383 inch.

Referring to FIG. 2, where like reference numerals have been employed, the anode cap 25 is preferably of a material such as that previously described and includes a portion thereof which fills recess 12, or it is preferred to have that portion not filling the recess to be pre-cast of an even more chemically resistant heat cured epoxy such as the reaction product of epichlorohydrin and Bisphenol A, suitably heat cured with aromatic amines, anhydrides or Lewis acids and adhered to anode with the aforementioned epoxy 25. In the form of the anode structure shown in FIG. 2, the anode cap does not include the extending portion 27 along the outer cylindrical surface of the anode 10 and is of substantially the same diameter and extends approximately one inch beyond the end 11 of the anode for anodes of approximately ½ to 2 inches in diameter. The insulated conductor or cable 15 also includes a high molecular weight polyethylene outer sheath, and in the area of entry of the cable into the cap a corrosion resistant sheath 30. The outer surface of the sheath is etched as previously described for chemical adhesion to the cap material or by use of an epoxy resin adhesive in the event that the cap is of a material other than epoxy. The inner surface of the sheath is etched to improve the seal provided by the sealant. To protect the joint between the anode cap 25 and the anode body 10 from entry of moisture and corrosive materials, the outer periphery of both the anode cap and the anode body is surrounded by a heat shrinkable fluorocarbon sheath 35 having essentially the same properties as sheath 30. Sheath 35 extends beyond the recess 13, and operates to prevent entry of moisture between the anode cap and metallic anode through the peripheral joint formed therebetween. Positioned between the outer surface of the anode and cap and the inner surface of the sheath 35 is a mastic sealant 38 which is of the same composition as mastic 32 and which serves the same function.

Although the anode cap 25 is bonded to the end of the anode, flexing of the cable 15 relative to the body 10 may cause a slight separation through which moisture may enter the recess. Also, changes in temperature and the difference in coefficient of thermal expansion between the anode and the cap 25 may weaken the bond. By surrounding the joint with a fluorocarbon sheath 35 which is in tight sealing engagement with the outer surface of the anode and the cap 25, the joint between the cap and the anode is protected and entry of liquid materials is substantially eliminated. In addition, the sheath protects the reduced anode section in this area from excessive galvanic corrosion.

The sheath 35 may vary in size depending on the diameter of the anode body. For example, in the case of an anode body of 1½ inches in diameter, a sheath having an expanded diameter of 1.7 inches and a recovered diameter of 1.3 inches with a wall thickness of 0.020 inch in the recovered condition operates satisfactorily. In the case of an anode body of 2 inches in diameter, a sheath of expanded diameter of 2.1 inches and a recovered diameter of 1.7 inches with a wall thickness of 0.020 inch in the recovered condition operates satisfactorily. The sheath is about four inches long, extending three inches along the outer surface of the anode body and covering the cap 25 which has a length of about one inch for anodes of 1½ to 2 inches in diameter.

The anodes shown in FIGS. 1 and 2 are assembled by coating a portion of the lead-in cable with mastic 32 and heat shrinking the sheath 30 over the mastic coated portion. During the heat shrinking operation, the mastic 32 is compressed and fills all spaces and voids to provide an extremely tight moisture seal. The cable is then bared and secured in undercut recess 13 and caulked. After this the cap assembly is cast or a pre-cast assembly is used. In the case of FIG. 2, the anode cap may be cast, since the epoxy resin fills part of the recess 12, or pre-cast and bonded to the end while the outer sheath 35 is heat shrunk over a previously mastic coated anode body, as shown, and the mastic is compressed as previously described.

One aspect of the invention relates to protecting the joint between anodes which have been joined end-to-end. Since the anode bodies are of high silicon iron, which is somewhat brittle and difficult to weld, it is somewhat difficult to produce anodes of high silicon iron of more than about five feet in length. Yet, there are installations which require relatively long anodes either because of the relatively high performance efficiency; or because the structure to be protected requires long anodes in excess of five feet, for example, open water box coolers about 10 feet deep, bowl sections of elevated water tanks, etc.

Referring to FIG. 3, an end-to-end anode connection in accordance with the present invention is shown. Each anode 40 and 42 has formed in the end thereof a cavity 12 including an undercut portion 13. The brass element 45 is secured within the cavity by a leaded connection 48 which mechanically secures it in place and provides an electrically conductive path between the element 45 and the anode body 40. The end of anode 42 is provided with a similar connection.

In view of the fact that it is difficult to machine anodes of high silicon iron, the brass element 45 is used to provide a mechanical and electrical interconnection between the two anodes 40 and 42. Positioned between the ends 40a and 42a of the anodes is a washer 50 of corrosion resistant material such as a fluoroelastomer, preferably a copolymer of vinylidene fluoride and hexafluoropropylene, and containing about 60% fluorine and having a molecular weight of between 100,000 to 200,000. A representative commercially available material is available under the trademark Viton and described more fully in Rubber World, March 1960. This particular copolymer possesses the characteristics of good high temperature stability and chemical inertness although it is somewhat more susceptible to chemical attack than materials such as polytetrafluoroethylene and fluorinated ethylene propylene. The washer 50 is adhered to the ends of the anode by an epoxy cement previously described and the cement substantially fills any voids in the anode and faces to prevent entry of moisture therebetween. The epoxy 52 also covers the outer peripheral edge of the washer 50, as shown.

Each end of member 45 receives a threaded stud 55 so that the anodes 40 and 42 may be mechanically joined. The stud passes through the washer 50 so that the washer is compressed between the opposing ends of the anodes to compress the washer and the stud. To prevent entry of moisture into the connection between the two anodes, a moisture resistant barrier is provided which includes an outer sheath 60 similar in composition to sheath 35. Between the inner surface of the sheath and the outer surface of the two anodes is a mastic material 62 having the characteristics of the mastic material 32 and 38. The sheath 60 is heat shrunk over the anode connection, and the sheath is sufficiently long so that it extends beyond the recesses 13 of each anode, as shown.

The anode shown in FIG. 3 is assembled by pulling the two anode sections together with the washer 50 therebetween. A tape of vinyl resin is wrapped around the joint to form a mold, and epoxy resin is used to fill the void between the washer and the opposed anode end faces. After the epoxy has cured, the mastic 62 is applied and the sheath 60 is heat shrunk in place. In the event that a rigid connection is required, the washer 50 may be omitted, with the ends of the anodes bonded together by an epoxy followed by application of the mastic and sheath, as described.

By using the anode connection and corrosion resistant moisture-tight seal shown in FIG. 3, it is possible to connect anodes end-to-end in order to provide relatively long anodes which operate to increase somewhat the efficiency of the anodic protection system. In view of the fact that the connection between the anodes is sealed by a chemically resistant moisture barrier, separation of the anodes through failure of the mechanical joint due to corrosion is substantially eliminated. Since the metallic components of the joint are of a composition different from the metallic composition of the anodes, any electrolytic action tends to weaken or destroy the mechanical bond thereby permitting the anode sections to separate with a resultant loss of length of anode and impairment in the function of the anode system.

Accelerated tests of anodes of the type shown in FIGS. 1 and 2 joined to another anode as shown in FIG. 3 under conditions simulating those in open water box coolers were undertaken. The anodes were of Durichlor 51 composition and exposed for 160 days in salt water at 180° F. with a current discharge of 5 amperes per square foot. In normal usage the current discharge is about 1 ampere per square foot. Examination after the test indicated that the anode was still performing satisfactorily and that the moisture seals remained effective in preventing corrosion of the cable to anode connection and mechanical joint between two anodes.

By the present invention, a seal is provided which is capable of operating under extreme corrosion conditions and at elevated temperatures as may be encountered in open box coolers as widely used in refinery operations. Also, the present invention permits joining of anodes end-to-end to increase the length of the anode, particularly of anodes having a chemical composition such that it is somewhat difficult, as a practical matter, to cast long anodes.

While the form of apparatus herein described constitutes a preferred embodiment of the invention, it is to be understood that the invention is not limited to this precise form of apparatus, and that changes may be made therein without departing from the scope of the invention.

What is claimed is:

1. An anode of the character described for a cathodic protection system, comprising in combination a generally cylindrical anode body, means in at least one end of said anode body forming a recess for electrical and mechanical connection to said body, insulated conductor means received in said recess, said conductor means including an electrically insulating outer sheath, means forming an electrical connection between said conductor means and said body, means in said recess mechanically and electrically interconnecting said conductor means to said body, plastic end-seal means bonded to said one end of said anode body and including means for passage therethrough of said insulated conductor means, said plastic end-seal means having an outer diameter at least equal to the diameter of the adjacent portion of said anode body, said electrically insulating sheath in the portion thereof which passes through said end-seal means being surrounded by a fluorocarbon resin sheath which extends beyond the end of said end-seal means, said fluorocarbon sheath being bonded to and in sealing relation with the opposed surface of said plastic end-seal means, and a corrosion resistant hydrophobic mastic material positioned between the opposed sealing surfaces of said electrically insulating sheath and said fluorocarbon sheath over substantially the entire opposed surface areas thereof.

2. An anode as set forth in claim 1 wherein said fluorocarbon resin sheath is a tube of heat shrinkable fluorinated ethylene propylene.

3. An anode as set forth in claim 1 wherein said plastic end-seal means is an epoxy resin and wherein the diameter of said end-seal is approximately equal to the diameter of said anode body.

4. An anode as set forth in claim 3 wherein said plastic end-seal means and the adjoining portion of said anode body are surrounded by a second fluorocarbon sheath for preventing entry of moisture between said end-seal means and said anode body, and a corrosion resistant hydrophobic mastic material positioned between the opposed sealing surfaces of said anode body and end-seal means and said second fluorocarbon sheath over substantially the entire opposed surface areas thereof.

5. An anode as set forth in claim 4 wherein said fluorocarbon sheath surrounding said insulated conductor means extends into said recess, and wherein said recessed fluorocarbon sheath extends along the outer surface of said anode body to a point beyond said recess.

6. An anode as set forth in claim 5 wherein said recess is at least partially filled with an epoxy resin, and wherein the portion of said fluorocarbon sheath surrounding said insulated conductor means is bonded to the opposing portion of said epoxy resin cap and the epoxy resin in said recess for preventing entry of moisture and the like into said mechanical and electrical connection.

7. An anode as set forth in claim 1 wherein said anode body is of high silicon iron.

8. An anode as set forth in claim 1 wherein said end-seal means is of a diameter greater than said anode body and includes an integral portion in sealing engagement with the outer surface of said anode body, and said integral portion terminating beyond said recess.

9. An anode as set forth in claim 1 wherein said anode body includes at least two sections of substantially the same outside diameter mechanically and electrically joined end-to-end at an end remote from said one end, and fluorocarbon sheath means positioned over said end-to-end joint to provide a fluid-tight seal about the outer periphery of the body in the area of said end-to-end joint.

10. An anode as set forth in claim 9 wherein the end-to-end joint of said anode sections includes a resilient fluorocarbon elastomer resin washer between the adjacent ends of said joined anode sections.

References Cited

UNITED STATES PATENTS

| | | | |
|---|---|---|---|
| 2,876,190 | 3/1959 | Oliver | 204—196 |
| 3,043,765 | 7/1962 | Bryan et al. | 204—196 |
| 3,046,213 | 7/1962 | Bender | 204—196 |
| 3,303,262 | 2/1967 | Turner | 174—77 |

JOHN H. MACK, Primary Examiner

T. TUNG, Assistant Examiner

U.S. Cl. X.R.

174—77